(12) United States Patent
Eurlings et al.

(10) Patent No.: US 12,186,674 B2
(45) Date of Patent: Jan. 7, 2025

(54) DICE SCANNING DEVICE

(71) Applicant: ARRANGED BV, Bilzen (BE)

(72) Inventors: Martin Eurlings, Bilzen (BE); Sebastiaan Van Dyck, Ledeberg (BE)

(73) Assignee: ARRANGED BV, Bilzen (BE)

( * ) Notice: Subject to any disclaimer, the term of this patent is extended or adjusted under 35 U.S.C. 154(b) by 204 days.

(21) Appl. No.: 17/724,203

(22) Filed: Apr. 19, 2022

(65) Prior Publication Data

US 2022/0314109 A1    Oct. 6, 2022

Related U.S. Application Data

(63) Continuation-in-part of application No. PCT/EP2021/079145, filed on Oct. 20, 2021.

(30) Foreign Application Priority Data

Oct. 20, 2020   (EP) ..................................... 20202870

(51) Int. Cl.
*A63F 9/04*     (2006.01)
*G06F 3/16*     (2006.01)
(Continued)

(52) U.S. Cl.
CPC ............ *A63F 9/0402* (2013.01); *G06F 3/165* (2013.01); *G06T 7/73* (2017.01);
(Continued)

(58) Field of Classification Search
CPC ............ A63F 9/0402; A63F 2009/2425; A63F 2009/2432; A63F 2009/2435; A63F 2009/2457; A63F 2009/247; A63F 2009/2488; A63F 13/213; A63F 13/215; A63F 13/87; A63F 13/98; A63F 13/92;
(Continued)

(56) References Cited

U.S. PATENT DOCUMENTS 11,538,307 B1\*   12/2022  Lever .................. G07F 17/3239
2019/0046863 A1\*  2/2019  Eurlings ................. G06F 3/017
(Continued)

FOREIGN PATENT DOCUMENTS

EP      2650217 A1     10/2013
WO   2017140385 A1      8/2017

OTHER PUBLICATIONS

International Search Report and Written Opinion from PCT Application No. PCT/EP2021/079145, Apr. 11, 2022.

*Primary Examiner* — Michael C Grant
(74) *Attorney, Agent, or Firm* — Workman Nydegger

(57) ABSTRACT

A dice scanner for assisting in electronic gaming is disclosed which comprises a flat scanner with a scanning surface and a processor. The scanning surface is adapted for the rolling of one or more thrown dice and the flat scanner is configured for acquiring images of the scanning surface and the dice rolling or resting on that scanning surface in real time. The processor is configured for receiving one or more acquired images of the scanning surface and deriving therefrom data relating to the dice. The dice scanner also comprises a video acquisition system and/or an audio acquisition system which are arranged relative to the scanning surface such that at least a user face and/or at least a user voice can be recorded while gaming.

17 Claims, 10 Drawing Sheets

(51) Int. Cl.
*G06T 7/73* (2017.01)
*A63F 9/24* (2006.01)

(52) U.S. Cl.
CPC ............... *A63F 2009/2425* (2013.01); *A63F 2009/2432* (2013.01); *A63F 2009/2435* (2013.01); *A63F 2009/2457* (2013.01); *A63F 2009/247* (2013.01); *A63F 2009/2488* (2013.01); *G06T 2207/10016* (2013.01); *G06T 2207/30201* (2013.01)

(58) Field of Classification Search
CPC . G06F 3/165; G06T 7/73; G06T 2207/10016; G06T 2207/30201; H04N 1/00244; H04N 1/0288; H04N 2201/0081; H04N 1/00328; H04N 1/00827; H04N 1/1061; H04N 1/195
USPC ........................................................ 273/146
See application file for complete search history.

(56) References Cited

U.S. PATENT DOCUMENTS

2020/0114252 A1* 4/2020 Eurlings ............... A63F 9/0468
2022/0314109 A1* 10/2022 Eurlings ............ H04N 1/00328

* cited by examiner

DICE SCANNING DEVICE

FIELD OF THE INVENTION

The present invention relates to the field of devices and methods for assisting in gaming. More particularly, the present invention relates to devices and methods for reading dice for electronic gaming, for example in online games.

BACKGROUND OF THE INVENTION

History has shown that in the exceptional times of the COVID-19 crisis with lockdowns, people being forced to stay at home, isolated from their friends and families, digital entertainment, more specifically online gaming, became very popular. Unfortunately, popular board games such as Monopoly, which typically involve several players, were lacking human interaction when played online or together with remote participants using video-conferencing tools, with or without the use of artificial dice (computer algorithm generated). Even with the use of a dice scanner (DSD) for assisting in playing the game, e.g., disclosed in patent application US 2020/0114252 A1, the interaction still lacks many crucial human aspects, such as a clear visual and auditory transfer of people's emotions. Also, the atmosphere or ambient scene of the rooms in which these board games are typically played, e.g., living rooms or bedrooms, are largely unnoticed, creating a perceived lack of coziness and home feeling with the other participants. A further disadvantage of the disclosed DSD is that, in order to communicate with other remote players, or with the DSD itself (e.g., for selecting settings, setting stakes, etc.), the users have to rely on numerous other devices like notebooks, PCs, tablets or smartphones, hereafter called third-party-devices, which leaves many third-party devices scattered on the table, occupying a large area of the table actually needed for playing, and which might also present an increased vulnerability to security breaches, compatibility issues, and/or acts of privacy violation. This causes unwanted distraction and has a negative impact on the game immersion.

Therefore, there is a need for dice scanners that provide a better game immersion experience to the players.

SUMMARY OF THE INVENTION

The use of disclosed DSD, as mentioned above, when used with the necessary third-party-devices has several shortcomings.

First, communication with the DSD itself, such as selecting settings, setting stakes or desired outcomes is only possible when relying on those third-party-devices connected to the DSD. Second, security and privacy for the transmission of the data cannot be guaranteed by DSD. The reliance on third-party-devices and their providers of these tools and services limits the DSD ability to instill trust in data collection and registration policies.

Third, since the capture, processing, transmission and playback of this data is done through a third-party device (e.g., PC, tablet or smart phone), its use can involuntarily be detrimental to the play experience when using the DSD. The reliance on third-party-device communication for data capture, processing, transmission and playback mechanisms, limits the quality of these processes to the capabilities of these means available in or connected to the third-party-device. For example, the quality, the positioning of a camera, a microphone, a speaker or any other input or output device cannot be controlled by the DSD to provide optimal conditions for capturing, processing, transmitting and reproducing this data in this specific environment, thus limiting the play comfort and feeling of the players. If one, or more, of the data capture, processing, transmission and playback mechanisms fails or operates in an undesired manner, the experience of the players suffers. The player must rely on the ability of the third-party-device(s) to capture, process, transmit and playback this data in a reliable and representative manner, with the flexibility and user-friendliness that is desired by the player. Additionally, the third-party-devices of two connected players of the DSD are not guaranteed to be compatible with one another, due to manufacturers of these devices being adamant that their device or platform can only communicate with other instances of their device line-up or platform, e.g., Operating Systems like Windows, Linux, Mac OS, Android, or other selected providers or manufacturers.

Fourth, the playing atmosphere suffers since the table of each player will be full of hardware devices, from DSD, to Notebook, external microphone or loudspeaker, just to name a few.

Lastly, using multiple devices concurrently, and requiring the player to switch between two or more devices is detrimental to the experience in playing the game and/or enjoying the communication with other parties. It distracts from the feeling of being involved in the game and/or communication and forces the player to divide his/her attention between the different in-and-output, reducing the focus on the game and its subsequent enjoyment.

It is an object of embodiments of the present invention to overcome the above-mentioned disadvantages. It is a further object of embodiments of the present invention to increase the fluidity of the game and to enhance game immersion and human interaction of remote players.

The above objectives are accomplished by devices according to embodiments of the present invention.

In one aspect, the present invention relates to a dice scanner for assisting in electronic gaming, comprising:
  a flat scanner having a scanning surface adapted for rolling of one or more thrown dice, the flat scanner being configured for acquiring images of the scanning surface and the dice rolling or resting on the scanning surface in real time,
  a processor configured for receiving one or more acquired images of the scanning surface and deriving therefrom data relating to the dice,
  a video acquisition system and/or an audio acquisition system arranged relative to the scanning surface such that at least a user face and/or at least a user voice can be recorded while gaming, thereby enabling interaction of said user with further, remote users or with the dice scanning device.

The dice scanner may comprise at least the audio acquisition system, wherein the audio acquisition system comprises at least one microphone.

The at least one microphone may be arranged on or in an upstanding sidewall of the dice scanner.

The dice scanner may further comprise a sound processor for digitizing, or digitizing and compressing, a user voice record.

The dice scanner may further comprise a network interface module for transmitting digitized user voice records to a data network and for receiving transmitted digitized user voice records of further, remote users and/or speech recognition processed user voice records from the data network.

The dice scanner may further comprise an audio output means for outputting recorded sound and/or voice of further, remote users, and/or for synthesizing auditory feedback relating to a game state, a user input and/or an operation of the dice scanner.

The audio output means may comprise at least one loudspeaker. The at least one loudspeaker may be provided as an external loudspeaker connected to an audio output connector of the dice scanning device, or wherein the at least one loudspeaker is arranged on or in an upstanding sidewall of the dice scanning device, said upstanding sidewall being secured to the scanning surface.

The dice scanner may comprise the video acquisition means, wherein the video acquisition means is provided as a camera.

The camera may be mounted on an extendable arm, having an extended and a retracted configuration, one end of said arm being secured to an upstanding sidewall of the dice scanner.

The extendable arm may be a foldable or telescopic arm, comprising at least two linked segments.

The upstanding sidewall of the dice scanner may comprise a recessed portion for storing the extendable arm in the retracted configuration.

The camera may be pivotably mounted on the extendable arm such that a camera orientation can be pivoted horizontally and vertically by at least 320° with respect to the scanning surface, and/or wherein a length of the extendable arm in the extended configuration is 50 cm to 100 cm longer as compared to the retracted configuration.

The dice scanner may further comprise a cellular communication module for accessing a data network.

The processor may be further configured for encrypting recorded video and/or audio data acquired by the video and/or audio acquisition means.

In one aspect, the present invention also relates to a dice scanner for assisting in electronic gaming, comprising:
 a flat scanner having a scanning surface adapted for rolling of one or more thrown dice, the flat scanner being configured for acquiring images of the scanning surface and the dice rolling or resting on the scanning surface in real time,
 a processor configured for receiving one or more acquired images of the scanning surface and deriving therefrom data relating to the dice,
 a receiving section for receiving an apparatus for capturing and/or displaying of video data such that the video data, when captured by the received apparatus while gaming, accommodates a front view of a user's face, and/or, when displayed on the received apparatus while gaming, is viewed by a user at an ergonomic viewing angle.

The receiving section may comprise a hinged holding member for holding said apparatus for capturing and/or displaying of video at a viewing angle, an elongated groove adapted to receive an elongated edge of said apparatus for capturing and/or displaying of video, and an inclination controller for adjusting the viewing angle of the holding ember.

The holding member may comprise extendable prongs, and/or the elongated groove is formed as an extrusion on an upper surface of an upstanding sidewall of the dice scanning device, said upper surface facing away from the scanning surface.

The inclination control device or inclination controller may comprise an adjustment screw, a fixation member rigidly connected to the flat scanner for retaining the adjustment screw in a fixed position relative to the flat scanner, and a threaded retaining member operatively engaging with the adjustment screw such that a rotation of the adjustment screw causes a linear translation of the retaining member relative to the flat scanner, whereby a contact angle between the holding member and a bearing surface of the retaining member, defining said viewing angle, is controlled.

In yet another aspect, the present invention also relates to a dice scanning device for assisting in electronic gaming, comprising:
 a flat scanner having a scanning surface adapted for rolling of one or more thrown dice, the flat scanner being configured for acquiring images of the scanning surface and the dice rolling or resting on the scanning surface in real time,
 a processor configured for receiving one or more acquired images of the scanning surface and deriving therefrom data relating to the dice,
 wherein the processor is further configured for generating image and/or video content and the flat scanner comprises a pixelated backlight structure for illuminating the scanning surface from a backside, opposite to the dice rolling side of the scanning surface, and for displaying the generated image and/or video content through the scanning surface to a user.

The flat scanner further may comprise a light detection layer arranged between the backlight structure and the scanning surface, the light detection layer including an array of transparent or translucent photodetectors.

The dice scanner further may comprise a network interface module for receiving image and/or video data from a data network, wherein the processing unit is configured for generating said image and/or video content based on the received image and/or video data.

The generated image and/or video content to be displayed by the backlight structure may be part of, or defines, a game layouts and/or a graphical user interface for receiving user input.

The graphical user interface may comprise a numeric key pad, a slider, a knob, and/or a button.

The processor may be further configured to detect user input in acquired images of the scanning surface, based on image contrast differences in the presence of a light-reflecting user input implement, preferably a stylus or a user's finger, in the vicinity of, or touching, the scanning surface in a user input sensitive portion of the displayed graphical user interface.

The dice scanner may be adapted for providing visual and/or auditory feedback on the detected user input.

The processor may be further configured for encrypting a received user input.

The scanner may comprise a transparent gas-bubble free substantially homogeneous adhesives or filler layer.

The dice scanner may be adapted for battery use.

It further may comprise at least one battery.

The derived data relating to the dice may comprise at least one of: an eye number on a dice face resting on the scanning surface, a shape of the dice, a size of the dice, a rest position of the dice on the scanning surface, a trajectory of the thrown dice rolling on the scanning surface, a rolling speed of the thrown dice rolling on the scanning surface, a rolling direction of the thrown dice rolling on the scanning surface.

A dice tray of the dice scanner may be formed by an upstanding sidewall structure rigidly secured to the scanning surface of the flat scanner, and a wall insert removably insertable into the dice tray in a tight fitting relation with the upstanding sidewall structure thereof, the wall insert being shaped to further restrain a rolling area for the at least one dice on the scanning surface, thereby modifying a play area of the dice scanner.

The present invention also relates to a kit of parts comprising the dice scanner according to an embodiment as described above, a plurality of differently shaped wall inserts, and optionally a stylus and/or at least one dice.

The present invention also relates to a method for facilitating playing dice with at least one dice scanning devices according to claim 4, comprising the steps:

recording a user voice uttering a command or input to a game in the vicinity of one of the dice scanning devices, transmitting the user voice record to a server with installed speech recognition software or hardware, processing the user voice record with the speech recognition software or hardware on the server to extract the uttered command or input to the game, and advancing a game state according to the extracted command or input to the game.

Advancing the game state may comprise updating a game state in a game software executed by the server, or comprises transmitting the extracted command or input to the game to each dice scanning device and updating a game state in a game software executed by the processing units of the dice scanning devices.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
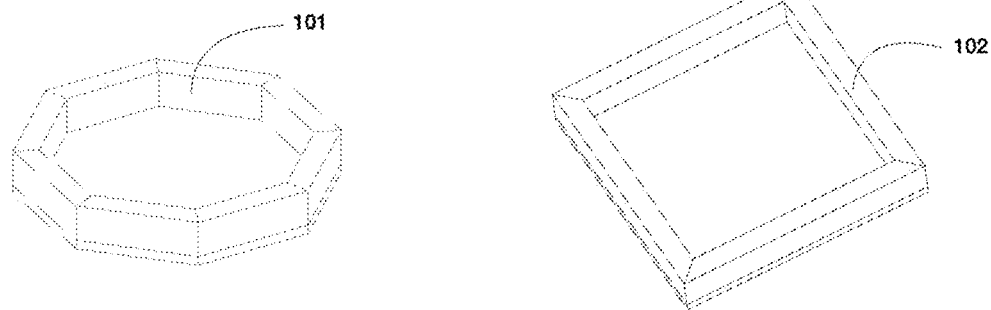
FIG. 1 shows a typical octagonally and rectangularly shaped dice tray of a dice scanner in accordance with embodiments of the invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect the present invention relates to a dice scanner for assisting in electronic gaming, comprising:
- a flat scanner having a scanning surface adapted for rolling of one or more thrown dice, the flat scanner being configured for acquiring images of the scanning surface and the dice rolling or resting on the scanning surface in real time,
- a processor configured for receiving one or more acquired images of the scanning surface and deriving therefrom data relating to the dice,
- a video acquisition system and/or an audio acquisition system arranged relative to the scanning surface such that at least a user face and/or at least a user voice can be recorded while gaming, thereby enabling interaction of said user with further, remote users or with the dice scanner.

The flat scanner of the dice scanner may comprise an illumination layer for illuminating the scanning surface from a side opposite to the side receiving said at least one dice and a light detection layer, arranged between the illumination layer and the scanning surface, the light detection layer comprising a plurality of photodetector elements operatively coupled to the processor.

Figure 3:
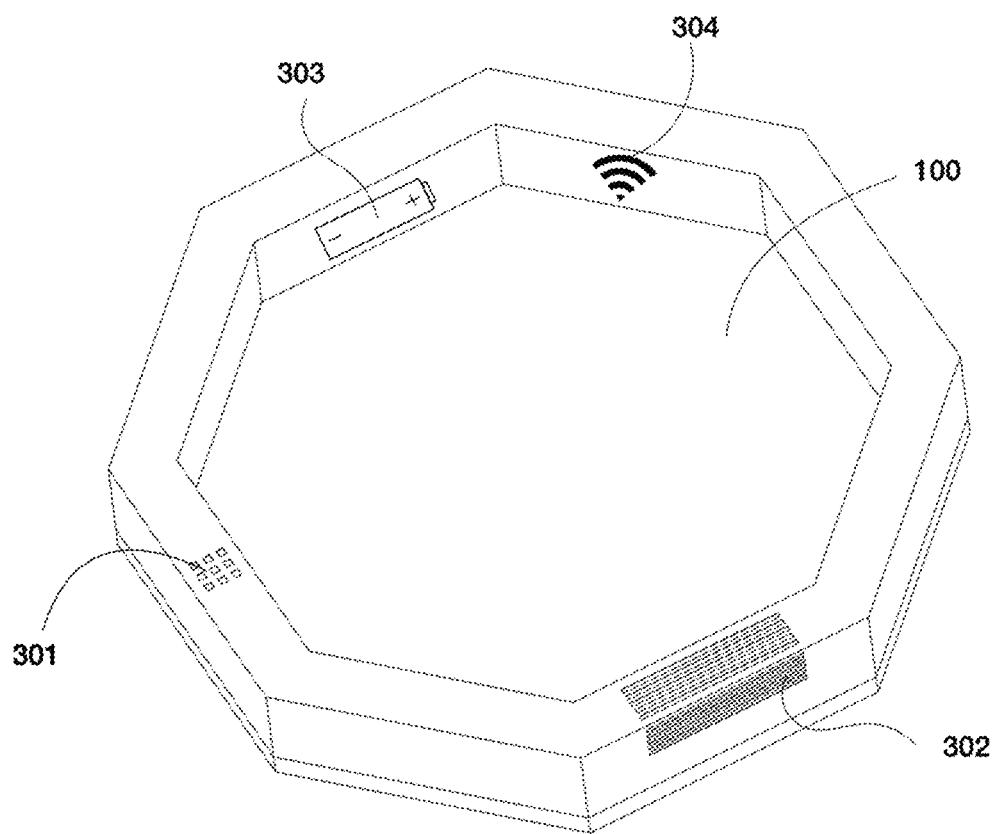
FIG. 3 shows a dice scanner with integrated microphone and loudspeakers, battery and cellular communication module, in accordance with embodiments of the invention.

A first embodiment will be described with reference to FIG. 3. The dice scanner may be equipped with a sound and/or speech capturing device 301, microphone, to capture sounds and/or speech registered in the vicinity of the device, more specifically the voice of the players and/or surrounding sounds. This input device can be of any suitable specification, for example Micro-Electronic Mechanical System (MEMS) or Electret Condenser (EC) microphones. The sound and/or speech capturing device may be located on any location on the DSD, preferably on the walls, or externally connected to the device, such as, but not limited to, via audio jack connector, USB, Firewire, Ethernet or via Wi-Fi, Bluetooth, etc.

A sound processor in the DSD, which may be part of or connected to the processor, may be adapted for digitizing the sound or voice registered by said sound and/or speech capturing device 301, e.g., microphone. The sound processor, e.g., the processor, is adapted for compressing and/or sending the digitized sound data via the specified data transmitters or media, e.g., USB, Firewire, Ethernet, WIFI, Bluetooth, etc.

The digitized sound data can be transmitted to a device with speech recognition functions, e.g., cloud-based AI speech recognition system. The result of the speech recognition process is then transmitted to the gambling/game server, where the result is confirmed and processed to advance the state of the game. The result and/or successful registration of the result is then transmitted back to the player's DSD, for example through the speakers 302 or a possible display functionality of the backlight 715 integrated in the DSD.

The following example of a betting phase using direct communication with the DSD is considered. During the betting phase, the player says "five", which is captured by the microphone. The analog sound waves are digitized in the DSD and then transferred to a speech recognition system. This speech recognition system analyses the digital sound file and derives that the number "five" was said. The "five" is sent to the game or gambling server, which processes and confirms the "five" back via the device's speakers or backlight imaging of the scanner surface to the player. In this case the player did not have to touch any third-party-device, increasing the fluidity of the play.

The capture and transmission of high-quality audio (voice and other sounds) aids in the immersion, human interaction and transmission of emotional states and feelings. Very often third-party-devices have poor sounds capturing devices incorporated, resulting in low quality sound transmission. Obvious is also that these third-party-devices often also have poor loudspeaker systems, again resulting in bad sounds transfer quality.

Another aspect of this incorporated microphone is related to security. Having its own incorporated microphone means it can be guaranteed that the data is directly routed to specific servers or other DSDs, and no third-party-device needs to be involved for this data. Possibly a third-party-device could be hacked or infected with malware, deviating/copying data to other unwanted servers.

The output of audio data can be achieved through audio and/or speech playback device(s) in the DSD. The DSD equipped with sound and/or speech playback device(s), can playback sounds and/or speech registered by the processor of the DSD, more specifically the voice of other players and/or their surrounding sounds, and/or sounds related to the operation of the device, such as, but not limited to, auditory feedback, game soundtracks, game sound effects, etc.

These audio output devices 302 can be of any suitable specification, such as, but not limited to, loudspeakers, e.g., paper, mylar, piezoelectric, piezoceramic or any other specification, magnetic speakers, micro speakers or mini speakers. These audio output devices may be included in the DSD to optimize the direction of sounds played, and ensure that audio transmission using the DSD is uniform over time and independent of the specification, size or location of a possible third-party-device. Playback of audio data (e.g., sounds) aids in the immersion by enabling other players' voices, commands, states of play, game soundtracks, sound effects and/or options to be communicated to the player(s). The device may still be equipped with a number of ports or connectors for connecting external or third party devices, used for input and output for data transmission, audio and video capture or playback. This allows the use of the DSD as an audio or video capture or playback device, in relation to a secondary device, and allows external devices used to capture or playback sounds and/or video to make a wired connection to the DSD. This way a headset, microphone, earphones, loudspeakers or any other type of audio or video capture or playback device can be connected as an addition to or replacing the capture and playback capabilities of the DSD. The connection to these external devices may be made via any of but not limited to phone jacks, USB, Firewire, Bluetooth, and/or Wi-Fi.

To increase the autonomy of the device, a rechargeable battery 303 may be incorporated into the DSD, reducing the number of cables required to operate the DSD, since the device can be powered by the battery. In this configuration, a power cable could be connected to charge the rechargeable battery, which can be done when the DSD is not in use for gaming, or while the DSD is being used. A further reduction of the number of cables can be achieved by incorporating a rechargeable battery in the DSD that is capable of charging wirelessly, via methods such as but not limited to electromagnetic induction, magnetic resonance, electric field coupling or radio reception.

These solutions reduce the number of cables for the DSD itself, but do not account for the battery of any external (third-party) device. One or more charging ports on the DSD allows third-party devices to be charged via cable through the DSD, which in turn is being charged by cable, wirelessly, or drawing power from its own internal rechargeable battery. The charging port(s) may be additional to the main charging port for the DSD itself. In a configuration with a single (two-way) charging port, the main charging port can be used to charge other devices. The latter option limits the charging options for the DSD itself while charging other devices, to wireless charging or not charging at all, depending on the configuration of the device. To further reduce the number of cables required to operate the DSD, wireless charging capability may be added in the supports for receiving a secondary device, denoted 501 in FIGS. 5*a* and 5*b*. When the supports 501 are in an upright position, and of a design that allows a third-party device's to be near the wireless charging pads when placed in the groove 505, the third-party device can be charged wirelessly. This wireless charging capability may be via methods such as but not limited to electromagnetic induction, magnetic resonance, electric field coupling or radio reception.

Incorporating any or multiple of the following: internal rechargeable battery, wireless charging capability, (a) charging port(s) for external devices and/or wireless charging capability for external devices, aids in the immersion by reducing the number of cables required to operate the device and preventing the surface on which the device is placed to be cluttered with cables. Additionally, these features allow the DSD and any external devices to be used in locations where a power outlet is not nearby, or where a power cable would obstruct one or more players to move freely around the device (e.g., a coffee table, couch, etc.)

When charging by cable, the transformer in the cable charger used to reduce the voltage to the correct voltage for the rechargeable battery, or direct power supply to the DSD, may be integrated in the upstanding walls or the underside of the device. This saves space and reduces clutter on the surface upon which the device is placed, and makes it easier for the device to be connected to a power source.

The autonomy of the device may be increased by incorporating a cellular communication module 304, e.g., a cellular communication module of the 3G, 4G, 5G or any future cellular communication technology standard. This would allow the DSD to operate in areas without Wi-Fi connection, for example during outdoor camping or in a park.

Figure 4:
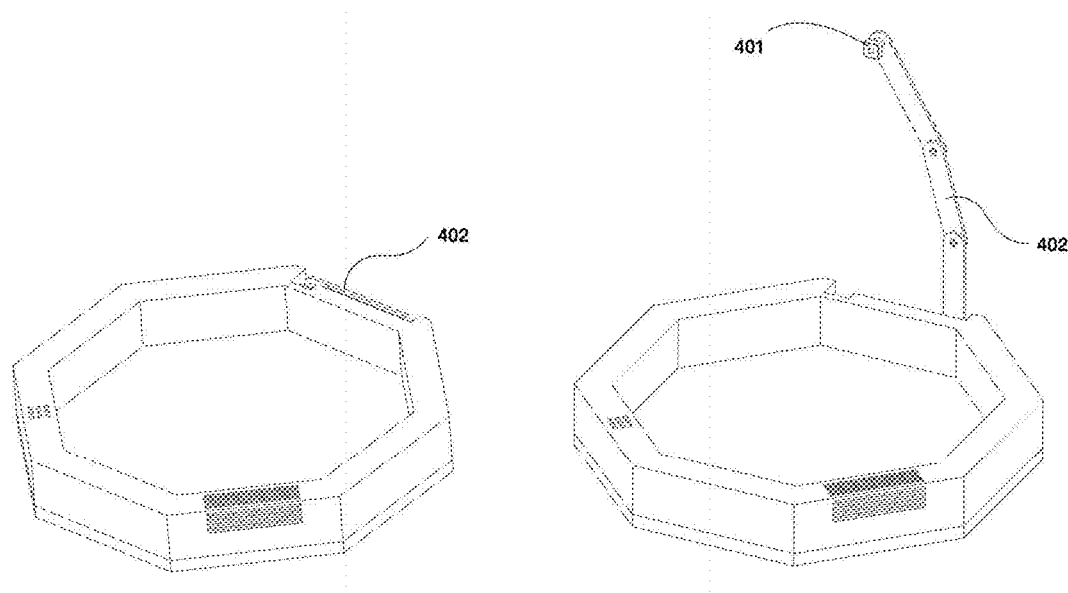
FIG. 4 shows a dice scanner for a retracted and an extended configuration of an arm onto which an integrated camera of the dice scanner is mounted, as can be used in embodiments of the invention.

FIG. 4 illustrates an embodiment of the invention, in which the dice scanner may be equipped with a video capture device 401, e.g., a camera of any specification, such as but not limited to a charge-coupled device (CCD) or a CMOS image sensor to capture an image of the user and/or the device surroundings. The camera may be mounted on an extendable arm 402, e.g., foldable or telescopic, which is fixed to the device and able to extend to a length preferably 50 cm to 60 cm, but not more than 1 meter. The camera preferably can be orientated in 320° direction, horizontally and vertically. These setting typically allows the capture of the player face in a full frontal view, looking in his/her eyes, thus creating an ideal level of human interaction between the players.

The transmission of the image and/or sound data captured by the camera and/or microphones can be accomplished via any video or audio data output connector, e.g., audio or video port, or transmission mechanism such as, but not limited to HDMI, USB, WIFI, ethernet, etc. The processor should be adapted for compressing and/or sending the captured data via the specified means.

Transmission of sharp video images of the player(s) and/or environments where they are playing aids in the immersion by enabling human interaction and transmission of emotional states/feelings.

In a second aspect, which may be combined with features of the first aspect, the present invention relates to a dice scanner for assisting in electronic gaming. The dice scanner comprises:
  a flat scanner having a scanning surface adapted for rolling of one or more thrown dice, the flat scanner being configured for acquiring images of the scanning surface and the dice rolling or resting on the scanning surface in real time,
  a processor configured for receiving one or more acquired images of the scanning surface and deriving therefrom data relating to the dice,
  a receiving section for receiving an apparatus for capturing and/or displaying of video data such that the video data, when captured by the received apparatus while gaming, accommodates a front view of a user's face, and/or, when displayed on the received apparatus while gaming, is viewed by a user at an ergonomic viewing angle.

Embodiments of the second aspect address the problem that when the camera of a third-party-device is used, people often see each other from a 'frog' perspective, looking more into their nose than straight into their eyes.

Figure 5A:
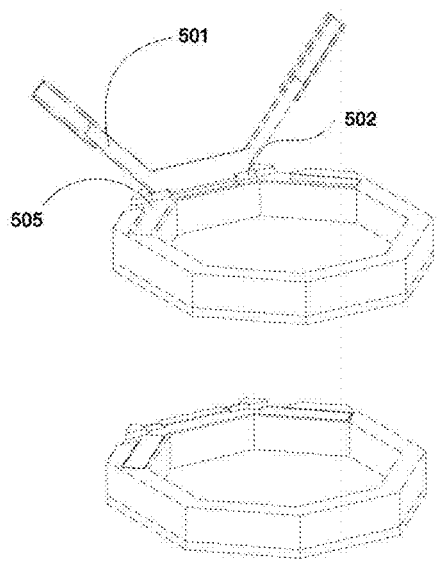
FIG. 5*a* and FIG. 5*b* show a holding member of a dice scanners according to an embodiment of the invention in an open and a closed position of the holding member, which is configured to support an apparatus for capture and/or display of video data at ergonomic viewing angles.
Figure 5B:
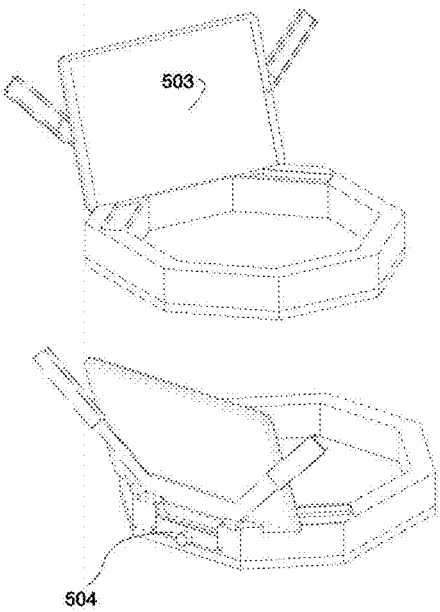
Figure 6A:
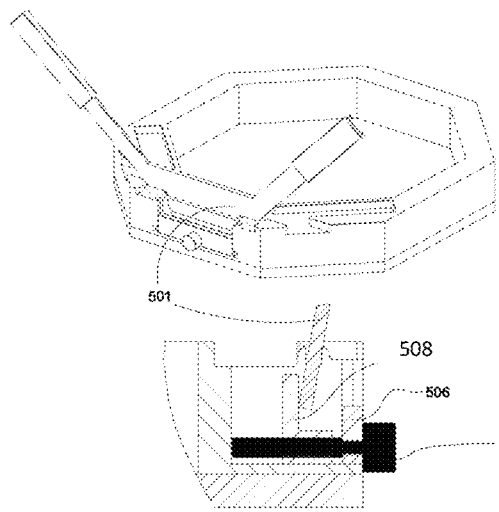
FIG. 6*a* and FIG. 6*b* show details of the inclination mechanism for the holding member of FIG. 5*a* and FIG. 5*b*.
Figure 6B:
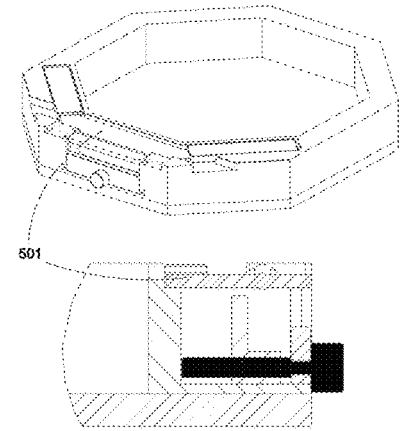

A possible solution for the use of third-party-devices in combination with the DSD is shown in FIGS. 5*a* and 5*b*, with further details of the inclination control device being displayed in FIGS. 6*a* and 6*b*. The DSD has supports 501 that are integrated into or laying on the walls of the DSD. They have a hinge 502 at the backside of the DSD, making it possible to open them. When opening, a groove 505 will appear in which a visualization device 503, such as a tablet PC or smartphone, can be set, keeping the underside of the tablet or smartphone at its position. With an inclination control device 504, the angle of the support can be adjusted, allowing the player to orientate the third-party-device camera or screen to their needs. The inclination control device 504 consists of an adjustment screw 507 allowing to change the position of the retained plate 508 —back and forward— for the support 501 inclination. The adjustment screw 507 is connected to a fixation plate 506 that has a fixed position to the DSD board or wall.

The incorporation of a camera allows a software program to recognize the direction of a user's eyes through eye-tracking detection algorithms. This, in turn, allows the user to select parts of the scanner as a location of interest. A prolonged focus (determined by the eye-tracking algorithm) on a particular part of the device can be compared by the program to the graphic image shown on the scanner, determining the choice the user is focusing on. For example; with this capability, the user can operate the numeric keypad shown in FIG. 7a solely with their eyes. The multitude of different input mechanisms for the device allow users to interact with the device in the way they deem most intuitive, as well as allow developers and games to be played on the device to incorporate more dimensions in their gameplay.

In a third aspect, which may be combined with features of the first and/or second aspect, the present invention relates to a dice scanner for assisting in electronic gaming. The dice scanner comprises:

- a flat scanner having a scanning surface adapted for rolling of one or more thrown dice, the flat scanner being configured for acquiring images of the scanning surface and the dice rolling or resting on the scanning surface in real time,
- a processor configured for receiving one or more acquired images of the scanning surface and deriving therefrom data relating to the dice,
- wherein the processor is further configured for generating image and/or video content and the flat scanner comprises a pixelated backlight structure for illuminating the scanning surface from a backside, opposite to the dice rolling side of the scanning surface, and for displaying the generated image and/or video content through the scanning surface to a user.

Figure 7A:
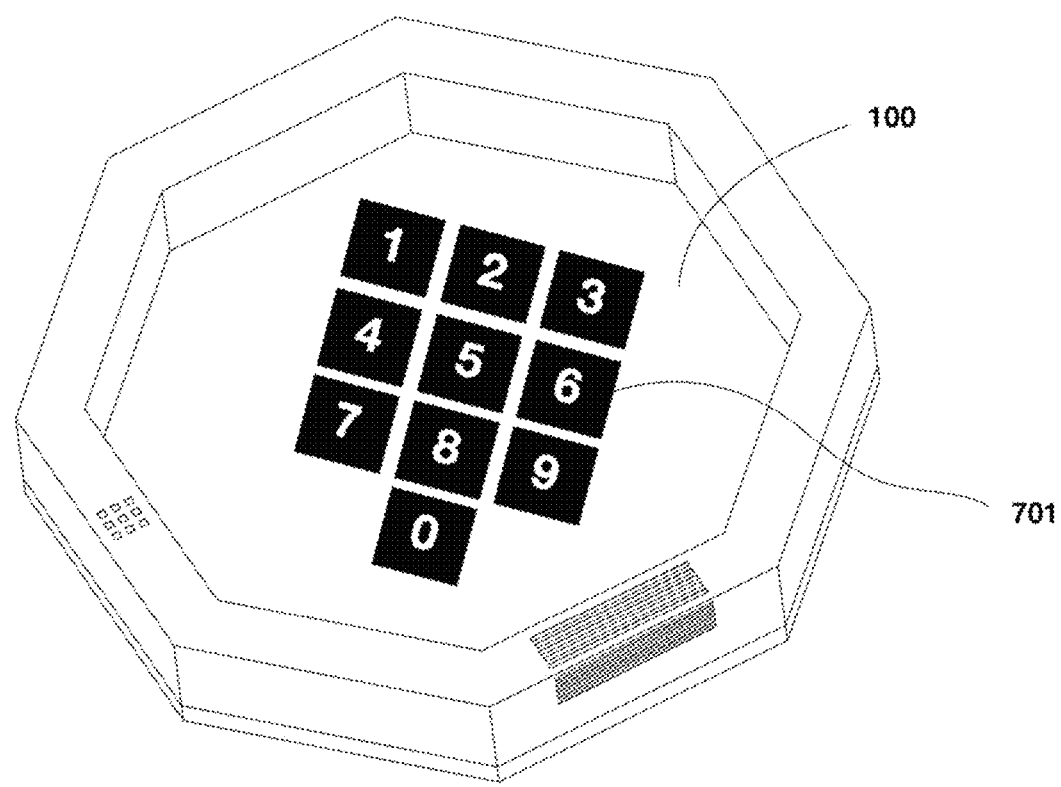
FIG. 7*a* shows a dice scanner displaying a monochrome numeric keypad on a scanning surface, in accordance with embodiments of the invention.
Figure 7B:
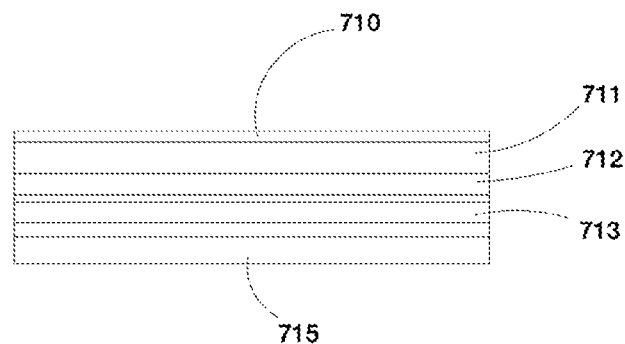
FIG. 7*b* is a cross-section of the flat scanner of the dice scanner according to an embodiment of the invention.

An embodiment of the third aspect will now be described with reference to FIGS. 7a and 7b. The backlight 715, positioned behind the array of photodetectors 713, may be adapted to allow imaging to take place on the scanning surface 100. The backlight may be adapted and/or configured so that monochromatic and/or full color images and/or video can be shown on the scanning surface 100 of the device. When using (organic) light emitting diodes or any other pixelated light source as the source of radiation, and with the use of a video processor, which may be part of the DSD processor, it is possible to show numbers or images (rudimentary or detailed) beneath or through the scanning surface. The backlight can also comprise any imaging technology that allows full color images to be shown on the scanning surface, such as, but not limited to, Liquid Cristal Display (LCD), Organic Light Emitting Diode (OLED), Light Emitting Diode (LED), LED-backlit LCD, quantum dot, micro LED, etc.

The quality of the resulting image on the scanning surface and applicability of the different technologies is dependent on the transparency of the array of photodetectors 713.

Also, the transparency of the top coatings 710 with anti-scratch, anti-dirt and/or anti-slip properties, the transparency of the protective glass or plastic plate 711, the possible use of transparent, and preferably gas-bubble free, substantially homogeneous adhesive or filler layer 712, will influence the properties of the image shown. These images 701 and/or video can comprise but are not limited to board game layouts, thematic backgrounds, surface textures, as well as buttons, keyboards, sliders, knobs and/or other visual input mechanisms.

Imaging on the scanning surface allows a more immersive experience when using the DSD device; scenes, colors and theme-specific imagery enhances the connection between player(s) and game. Board game layouts allow the user to follow the progress of the game independently of a secondary device (PC, tablet, phone). It allows for the DSD to show a specific game state, indicating a win or a loss, or a specific outcome of a throw. For example, when a player throws the dice so that both dice come up with 1 pip on top, individual pixels of the light source can be activated to show the words "Snake Eyes", common vocabular for this outcome. Likewise, it can show "WIN" after a winning throw, "LOSS" after a losing one and accompanying images (stars, fireworks, etc.) Another feature of this embodiment is that an external party (for example game server) can display images or comments on the scanning surface, for example 'THROW NOW' or 'FALSE'.

The scanner of the DSD may be programmed for recognizing the touch of a finger or stylus, or any object larger than a diameter of 3 mm. Placing an object upon a number or image shown in the way described previously, reflects the light back to the photodetectors, allowing the position to be registered through the x and y coordinates. The scanner, registering this touch and comparing the location of this touch with the location of images formed on the scanning surface, determines which part of the image shown was selected thus confirming the choice made by the player. For example, the backlight produces a numeric keypad 701 on the scanning surface 100 of the DSD. The player touches the button labelled 3 with their finger, the scanner will recognize the position of the finger, comparing it to the graphic image of the numeric keypad and conclude that the finger was put in the graphic area where the button 3 was shown. The DSD will then take the number "3" as input. This way we transform the scanning surface for the dice into a digital numeric keypad.

Registering touch on the scanning surface allows the user to interact with the device in a direct manner, relying less on other input mechanisms of third-party-devices for input. This new input function on the DSD can be used to enter a betting amount or a verification code directly through the DSD to the gaming server, thereby avoiding sensitive data to go through intermediate channels (PC, tablet) and manipulation thereof. Additionally, this enhances player experience by limiting the input needed on secondary devices and prevents excessive switching between the device and a possible second device. Moreover, the new input function of the DSD can be used to configure an operating mode of the DSD itself, or parts thereof. For instance, a battery economy mode may be selectable via the new input function, allowing the user to reduce battery consumption of the device, e.g., by dimming the amount of backlighting illumination. Another example may relate to the configuration of the sound capture and/or replay quality (e.g., sampling rate, compression rate, dynamic range, etc.) of the microphone(s) and/or loudspeaker of the DSD. Likewise, a video quality of a camera recording the user's face expressions may be modified via this new input function.

These two latter implementations (backlight imaging and/or registering touch on the scanning surface) allow the DSD to be used while relying less on supporting devices as in- and output mechanisms, and make the experience more like playing an original game, e.g., playing the game on a regular dice tray. This is manifested in the absence of one or more peripheral devices, adhering more to the original way of using a dice tray. Less supporting devices make the experience more like playing a real game, and brings the experience closer to the original DSD intends to digitize.

To enable the device to be useable in a multitude of environments, the operating principle of the main scanning function of the device is considered; as described previously, by using the backlight to illuminate and reflect light on the underside of an object placed on top, the resulting data from the array of photodetectors can subsequently be used to recognize differences in reflected light on the reflected surface. In this case, almost all of the light that reaches photodetectors in the part of the array directly under the object is generated by the backlight, and the rest of the array is lit by ambient light, which can vary in type, colour and intensity depending on the environment the DSD device is in. The use of (any number of) displays in the vicinity of the DSD device, and/or the light from a light curtain producing system as described for example in patent application US2020/0114252 A1 all contribute to the ambient light reaching the photodetector array.

Considering the ambient light conditions in the space the DSD device is operating in, is important for several reasons. Firstly, if the intensity of the reflected light from the backlight is different from the intensity of the ambient light, it allows the shape of the die to be recognizable in a captured image. Alternatively, transparent objects can be recognized without the use of the backlight. A transparent die for example, will block ambient light only at the non-transparent locations of the eyes on the die, allowing the resulting image to show contrast between the eyes of the die, the die body where ambient light is partly blocked, and the rest of the image where ambient light is not blocked. Since the analysis of the images captured by the array of photodetectors is based on these differences in light intensity, it is beneficial to adapt said analysis based on the intensity of ambient light. The characteristics of ambient light may be measured in a calibration step, where the user may be prompted to set up the device in the area the device will be used in to operate. The measured characteristics such as light intensity can be considered as a base value, meaning there is no object on top of the scanner at the location of a photodetector when said photodetector detects a light intensity equal or similar to the amount set as the amount of ambient light.

This recognition and calibration of the intensity of ambient light may be performed every time the device is started for a new session, every time the device detects a substantial shift in ambient light conditions, at regular intervals, after every input, or any combination of the mentioned intervals. Furthermore, the recognition of the intensity of ambient light allows the processor to change the intensity of the backlight to a setting that is optimized for power consumption, readout, and visual appearance. At low ambient light levels for example, the backlight intensity can be relatively low as well, compared to high backlight levels.

Furthermore, depending on the light source of the ambient light, additional effects have to be taken into account. Natural light is a relatively constant light source which can shift in intensity, prompting the calibration step in the previous paragraph. Artificial lights however, which are likely to be located above the scanner in practical settings, are inherently variable in their light intensity over a much shorter time period. While largely imperceptible to the human eye, most artificial lights have a tendency to flicker at a range of different frequencies when connected to a regular power supply. Some light sources (incandescent lamps for example) do not switch quickly enough between on and off for the filament in the light to cool down to a visible level, meaning the light source is relatively constant. Other light sources on the other hand, such as light emitting diodes, switch between on and off (emitting and not emitting light) much more rapidly, resulting in a periodic light pulse that can be visible to highly sensitive people or due to stroboscopic effects when moving. For example, due to the 50 Hz AC frequency, which is rectified to DC, the delivered light of LED lights can fluctuate at 100 Hz if not corrected by a LED controller or driver.

If the integration time for the photodiodes in the device is set at a level that produces a similar frequency or a multiple of the flicker frequency in the ambient light source, the resulting image can be distorted. This distortion can manifest itself as follows; when the ambient light is on and emitting light, the line of photodetectors that are actively being read at that moment receive light. Once the integration time has passed, the photodetector array activates the next line of photodetectors. By the time the photodetectors any number of lines further in the array are active, the ambient light has switched off for at least the duration of the integration time, creating a lower light value at those locations on the scanner.

Given that the ambient light may be any combination of any number of light sources of any type, there may be a number of flickering lights reaching the scanner at different frequencies. Since these ambient light sources are hard to control, and the device should be useable in as many ambient light conditions as possible, the device may be adapted to recognize and correct for these effects. This is achieved by using the array of photodetectors to detect one or more flicker patterns in an ambient light source, which can be achieved by varying the integration time necessary to detect light, and measuring if the effects mentioned are present at different integration times. A multitude of different integration times can confirm which integration times are desired or to be avoided, and be used in calibrating the device.

Additionally, one or more specialized separate photodetectors, specifically optimized for detecting the impact of the ambient light source on the photodetector array may be included in the device, to avoid that the photodetectors in the main array are used for calibration, and are unavailable for reading out objects.

Depending on the light type of the backlight and/or light curtain, the backlight and/or light curtain may exhibit similar characteristics to the flickering ambient lights. To prevent flicker from these light sources from interfering with the operation of the photodetector array, the backlight and/or light curtain may be controlled in conjunction with the photodetector array by adapting the integration time of the photodetector array and/or the flicker frequency of the light source(s). By utilizing an integration time not impacted by a set flicker frequency, or by adjusting the light flicker frequency to a level that does not interfere with a set integration time, the full range of readout speeds for the photodetector array can be utilized, allowing a wider operating window.

These aspects of the device enable it to be used reliably in a multitude of realistic environments, and prevent the surroundings in which the device is used to have an impact on its practical operation. Recognizing, changing and/or correcting for light intensity and flicker in all light sources reaching the photodetector array avoids prompting and requiring the user to change the ambient lighting conditions, move the device, or any other physical interaction to ensure the correct operation of the device. Additionally, it allows for a more reliable and fluid game playing experience, where a change in ambient lighting conditions is not detrimental to the experience. This means the player can change ambient lighting conditions and move the device at will while it is being used, without impacting the performance of the device.

An additional fingerprint sensor may be integrated in the base or the upstanding walls of the device, to allow a user to identify themselves. The fingerprint sensor may be integrated in a power or other button on the device. Depending on the quality and specification of the scanner plate incorporated in the DSD tray, a player's single or multitude of fingerprints or even the complete hand palm may be recognized by the scanning surface after the player is prompted to do so. Either way of identifying the current player may be used to automatically configure or select preferred settings by the identified player, or enforce restrictions on certain applications or operations on the device or services connected to the DSD device. This way this will prevent children from playing on adult gambling sites, their fingerprints or hand palm would not be considered valid to connect to such services. An algorithm could be integrated where applications offering gambling or other restricted services have to verify the identification of the player operating the DSD, enforcing the identification check through fingerprint or hand palm scanning or other identification systems (e.g., scanning of I.D. card or driver licenses). In countries where I.D. cards, driver licenses or bank cards have integrated security tokens, through an integrated or connected card reader port, such security can also be used to validate the identity of the player and unlock security restrictions.

This security system can be enhanced with a software algorithm checking the DSD internal restricted IP address database memory, where IP addresses of services that are not allowed to access without identification are stored. This allows the device to prevent use by individuals deemed unfit to operate devices related to gambling, and helps enforce black-listed players from gaining access to gambling services through online gambling applications. Referring briefly to FIG. 1, a digital dice tray is shown which is assumed to have a fixed octagonal shape 101. This fixed shape is mainly determined by the area comprising the scanning surface and the upstanding walls fixed thereon. It would be beneficial to the device's user, however, if multiple shapes could be selected for the dice tray. This allows the player to select a suitable dice tray structure fit for the game they intend to play. These differences in playing field shape are for example e.g., octagonal (Yahtzee), rectangular (backgammon), square, circular, etc. This can be achieved by the following specification.

Figure 2:
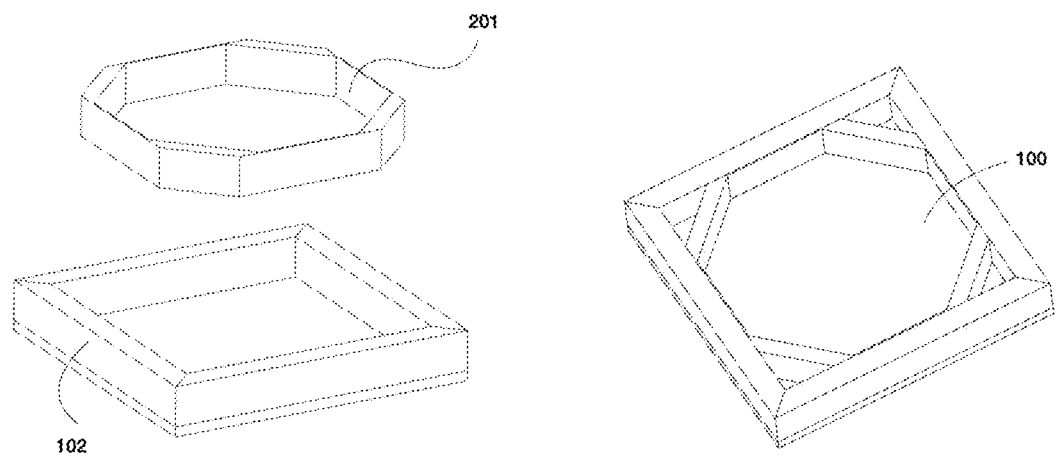
FIG. 2 shows an octagonally shaped wall insert, which can be used in embodiments of the invention to modify the playing area from a rectangle into an octagon.

As illustrated in FIG. 2, the dice scanner may be equipped with a removable upstanding wall of any suitable shape fitting inside the original shape of the upstanding wall, such as but not limited to octagonal, circular, rectangular or square. This removable upstanding wall insert 201 ensures that players can alter the shape of the dice tray that best fits their needs, and allows a larger range of games that can be played using the rectangular dice tray 102. Due to the characteristics of the scanning method, shapes can be easily recognized on the scanning surface, thus the scanner can easily recognize if the play will take place on a rectangular, octagonal or circular playfield on the scanner surface. Therefore, the present invention also relates to a kit of parts comprising any of the previously described dice scanners, a plurality of differently shaped wall inserts, and optionally a stylus and/or at least one dice.

In yet another aspect the present invention relates to a method for facilitating playing dice with at least one dice scanners comprising at least an audio acquisition system and a network interface module. The method comprises the steps of:
- recording a user voice uttering a command or input to a game in the vicinity of one of the dice scanners,
- transmitting the user voice record to a server with installed speech recognition software or hardware,
- processing the user voice record with the speech recognition software or hardware on the server to extract the uttered command or input to the game,
- advancing a game state according to the extracted command or input to the game.

Advancing the game state comprises updating a game state in a game software executed by the server, or comprises transmitting the extracted command or input to the game to each dice scanner and updating a game state in a game software executed by the processors of the dice scanners.

According to some embodiments of the present invention, a dice scanner is described, wherein flicker is used by the system to provide one or more security mechanisms.

To enable the device to be useable in an a multitude of environments, the operating principle of the main scanning function of the device is considered; as described in patent WO2017/140385 A1, which is incorporated herein by reference, by using a backlight to illuminate and reflect light on the underside of an object placed on top, the resulting data from an array of photodetectors can subsequently be used to recognize differences in reflected light on a reflected surface. In this case, almost all of the light that reaches photodetectors in the part of the array directly under the object is generated by the backlight and reflected back towards the photodetectors, while the rest of the array is lit by ambient light which can vary in type, colour and intensity depending on the environment the device is in. The use of (any number of) displays in the vicinity of the device, and/or the light from a light curtain producing system as for example described in patent application US2020/0114252, incorporated herein by reference, A1 all contribute to the light reaching the photodetector array in the space where no object is on top or close to the scanning surface of the imager.

The light conditions in the space the device is in is important for one or more or all of the following reasons. Firstly, if the intensity of the reflected light from the backlight is different from the intensity of the ambient light, it allows the shape of an object on top to be recognizable in a captured image. Alternatively, transparent objects can be recognized without the use of the backlight. For example, a semi-transparent die will block ambient light only at the non-transparent locations of the eyes on the die, allowing the resulting image to show contrast between the eyes of the die, the semi-transparent die body and the unobstructed part of the imager where ambient light is not blocked. Since the analysis of the images captured by the array of photodetectors is based on these differences in light intensity, it is beneficial to adapt said analysis based on the intensity of ambient light.

According to embodiments of the present invention, an exemplary imaging device that measures (variable) ambient light conditions, and utilises the measured conditions as a watermark for security purposes, is disclosed herewith.

Figure 8:
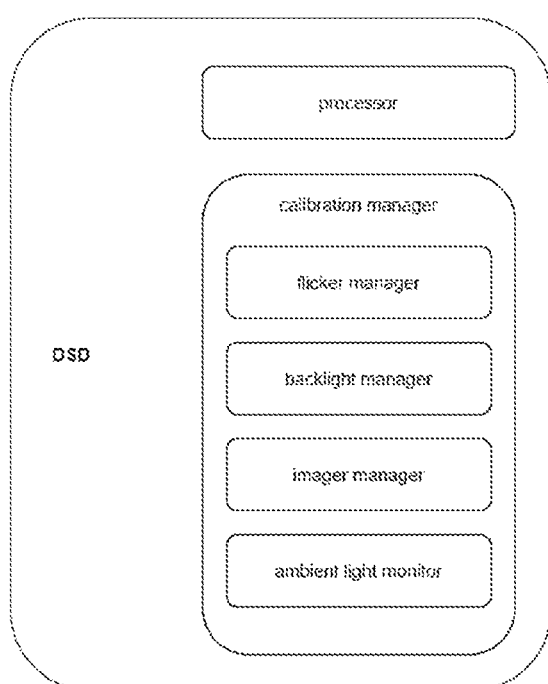
FIG. 8 to FIG. 16 illustrate examples of dice scanners handling or making use of flicker, according to embodiments of the present invention.
Figure 9:
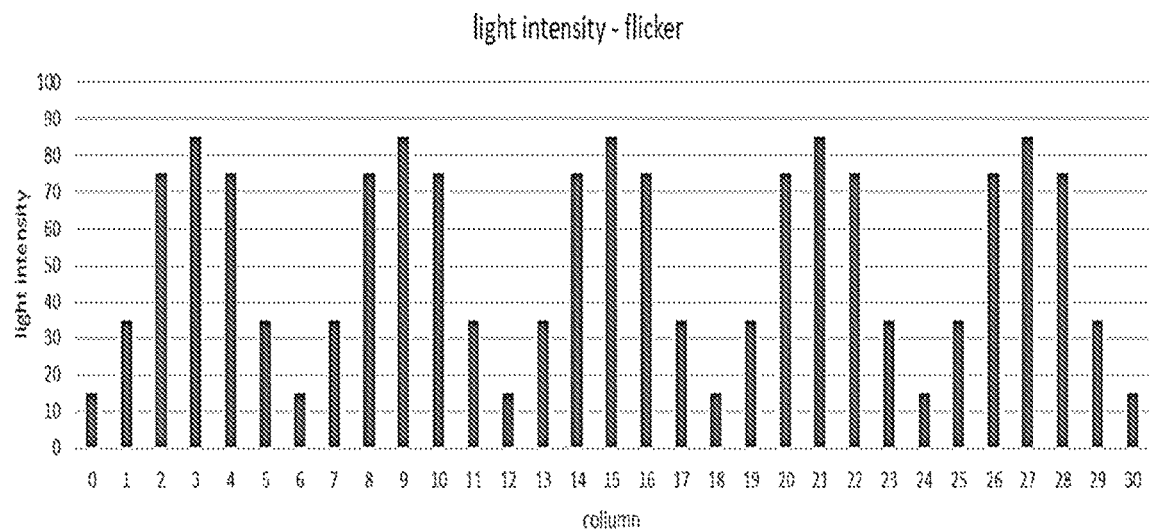

FIG. 8 shows a schematic representation of an example backlit imaging device designed to optimize the operating and lighting conditions for readout of objects above the imager. The flicker manager, backlight manager, imager manager and ambient light monitor are a representation of a number of functions present in the device, and may be separated or grouped differently, in any number of components in the device. The cited managers may for example be combined in a single 'calibration manager'.

In one particular exemplary embodiment, the invention not being limited thereto, a single calibration manager may comprise one or more of the following managers. Where reference is made to a manager, reference is made to a software based controller or a hardware implemented controller. Such a controller may in some embodiments comprise pre-programmed algorithms or corresponding electronic circuits. In other embodiments, such controllers may comprise elements of circuits corresponding with artificial intelligence. In an exemplary calibration manager, the calibration manager may comprise a flicker manager which does not measure the flicker but only manages the flicker. The calibration manager also may comprise a backlight manager, which may comprise a frequency manager and/or an intensity manager. The calibration manager also may comprise an imager manager which may comprise a frequency manager e.g., controlling/using/determining the integration time, and/or a frame rate manager. The calibration manager also may comprise an ambient light monitor for analysing parts of the imager without objects, which may comprise one or more of an intensity monitor and a flicker monitor for monitoring intensity and/or flicker.

The calibration manager sends and receives input from a processor housed in the device, i.e., inputs such as but not limited to prompts for calibration, calibration data, and reliability estimates.

In one embodiment, a dice scanner according to an embodiment of the present invention may use backlight control as described below.

At the start of a new session for the device, an ambient light monitor may measure the characteristics of ambient light, and the user may be prompted to set up the device in the area the device will be used in to operate for at least the start of that particular session. A session thereby may be defined as a single continuous period of play, e.g., a single evening, a single game instance, etc. The measured characteristics of ambient light conditions can then be considered as a base value, and used as a starting point for the dynamic operation of the imager. Preferably, at least part of these measurements are performed on an imager with no object on top of the imager. For example, the ambient light intensity measured can be set as the expected light value at the location of a photodetector when no object is on top. When said photodetector detects a light intensity equal or similar to the amount set as the amount of ambient light at a later time, the processor can derive, based on the individual light value, that there is no object on top of the imager at that location. To prevent the flicker of ambient light sources impacting the overall light intensity monitoring function, the light intensity monitor can measure multiple frames in time and average the values captured over the different frames. Should the frequency of a flicker introduced by ambient light be aligned with the framerate of the imager, the banding visible in the readout would remain equal over different frames, skewing the measurement of average light intensity values. Using a selection of different frame rates and/or spacing the capture of different frames in time, for example by selecting a set of 100 frames randomly distributed over time in a period of 5 seconds, this effect can be mitigated.

The recognition and calibration of the intensity of ambient light by the intensity monitor may be performed continuously, every time the device is started for a new session, at regular intervals, after every input, on predetermined check-up intervals, at random intervals or any combination of the mentioned intervals.

The recognition of the intensity of ambient light allows the processor in some embodiments to instruct a backlight manager to change the intensity of the backlight to a setting that is optimized for power consumption, readout, and/or visual appearance. At low ambient light levels for example, the backlight intensity can be relatively low as well, compared to high ambient light levels. This example improves the visual appearance of the imager in a dark room (no bright backlight), reduces power consumption, and has little or no impact on the quality of the readout.

In some embodiments, the backlight intensity manager can alter the backlight intensity according to for example the following specifications average ambient lighting value $\overline{L}$
physical boundaries of backlight component $B_{min}$ and $B_{max}$
backlight intensity B
reflectivity of objects placed on top $R_1, R_2, \ldots R_N$
So that the backlight intensity B,
adhering to $B_{min}<B<B_{max}$,
can be minimized while $(R_1, R_2, \ldots, R_N)*B \neq \overline{L}$.

In some embodiments, the dice scanner comprises an ambient light monitor which monitors flicker effects. Depending on the light source of the ambient light, these effects have to be taken into account. Natural light is a relatively constant light source which can shift in intensity slowly, prompting the calibration step in the previous paragraph. Artificial lights however, which are likely to be located above the imager in practical settings, are inherently variable in their light intensity over a much shorter time period. While largely imperceptible to the human eye, most artificial lights have a tendency to flicker at a range of different frequencies when connected to a regular power supply. Some light sources (incandescent lamps for example) do not switch quickly enough between on and off for the filament in the light to cool down to a visible level, meaning the light source is relatively constant. Other light sources on the other hand, such as light emitting diodes, switch between on and off (emitting and not emitting light) much more rapidly, resulting in a periodic light pulse that can be visible to highly sensitive people or due to stroboscopic effects when moving. For example, due to the 50 Hz AC frequency, which is rectified to DC, the delivered light of LED lights can fluctuate at 100 Hz if not corrected by a LED controller or driver.

The way the imager is read out means distortions can manifest itself as follows; when the ambient light is on and emitting light for the majority of time a line of pixels is being read, the pixels will register the light as being on. In other rows of the display that are read out at a different time but are registered as being the same frame, the light will have been off for the majority of time the pixels have been active, making them register a lower light value.

In a single frame, this will make parts of the imager read as if the overhead light was switched on, and other parts where the imager reads as if the overhead light was switched off or only partially switched on. This creates a striped pattern on the imager and decreases the quality of the image, and reduces the effectiveness for subsequent processing of said image. If the integration time (the time it takes for 1 line to be read out) changes, the effects measured are of course also altered.

Given that the ambient light may be any combination of any number of light sources of any type, there may be a number of flickering lights reaching the scanner at different frequencies. Since these ambient light sources are not controllable, and the device should be useable in as many ambient light conditions as possible, the device may be adapted to recognize, correct and/or utilize these effects.

Firstly, the array of photodetectors or a separate integrated specialized photodetector, such as for example described in U.S. Pat. No. 6,208,433B1 but embodiments of the present invention not being limited thereto, can detect one or more flicker patterns in an ambient light source, by recognising patterns (stationary and/or moving) in the readout of the display or the separate specialized photodetector. The speed of the readout, and the speed with which a single or multiple patterns move in relation to the scanning surface, may allow the intensity and frequency of a light source producing flicker to be calculated, by utilising distances between signal maxima, Fourier transformations, or other methods, such as for example methods as described in U.S. Pat. No. 6,658, 203B1—embodiments of the present invention not being limited thereto. More concretely in one example, similar to the histogram method in U.S. Pat. No. 5,793,886A, an average light value can be calculated for every row or column (depending on the direction of the readout/positioning of driver and readout IC's.

As highlighted for example in U.S. Pat. No. 6,208,433B1, objects on top of the imager at the time of measurement would distort the analysis. The recognised objects in the frame should therefore be discarded from the analysis, allowing the average lighting value for the column to consist of open scanning space without objects on top. Next to the obstruction of the ambient light, objects should be removed from the analysis since they are reflecting light from the backlight of the imager, which can have a different frequency and/or intensity than the ambient light the device is trying to measure.

In some embodiments, objects can be removed from the imager by setting the average lighting value of different rows or columns equal to the expected average lighting value of the rows or column, based on the pattern on the rest of the imager. For example, an imager has 100 columns, and an object on top obstructing 8 columns. The flicker of an ambient light source has a period of 4 columns; it causes 2 columns to be lit, and 2 columns to appear unlit, repeating over the entire imager. The 8 obstructed columns however will show a different average lighting value. The different value is recognized by the flicker monitor, and the column values is changed to the expected value for that location of the imager.

Upon analysing the average light values, a formula can be fitted to assess the frequency (relative and absolute) and intensity of the light source(s). For example, the histogram below shows a possible average lighting value for every column in a single frame of capture. The intensity is calculated as the difference between the average height of each pulse and the average low light value between light pulses, and the relative frequency is derived from the difference between two similar points in 2 adjacent pulses. Given that the speed/frequency of the imager is known, the actual flicker frequency calculation is obvious.

The methods applied to correct the flicker measured are executed by the flicker manager. The details of these methods are as described above found in the patents discussed previously.

Depending on the light type of light sources integrated and/or controlled by the device (such as backlight and/or light curtain), the controlled light sources may exhibit similar characteristics to the flickering ambient lights. To prevent flicker from these light sources from interfering with the operation of the photodetector array, the light sources may be controlled in conjunction with the photodetector array, to minimize the effects of light flicker reaching the imager, or for security purposes, as described further. Embodiments of the present invention therefore also may encompass control accordingly.

By adjusting the frequency and/or intensity of the flicker of the controlled light sources to values that do not interfere with the operation of the imager (i.e. the light does not flicker at all, or flickers at a rate so that no effects are visible on the imager given a set integration time), the impact of backlight flicker can be removed. Should this not be possible, due to the light sources not being capable of flickering in the method proposed, the controlled light sources can be set to flicker with the same characteristics as the uncontrolled (ambient) light sources, as measured by the methods described previously. This way, the number of different sources of flicker interference on the imager are minimized, which facilitates easier processing by the known methods of flicker correction.

Figure 10:
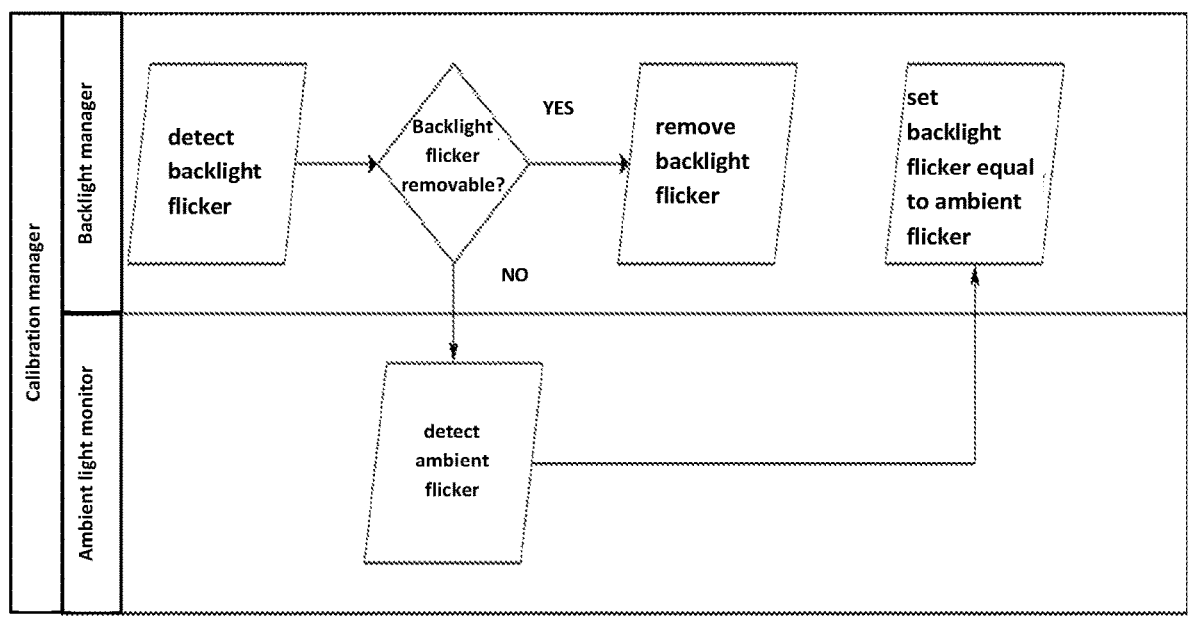

In practice, the flicker generated by a controlled light source is predictable by the backlight manager, since the backlight manager drives the operation of the controlled light sources. If the flicker is removable, the backlight manager applies the methods described above. If the flicker is not removable, the ambient light monitor relays the ambient flicker information to the processor, which prompts the backlight manager to set the backlight flicker equal to the ambient flicker. FIG. 10 shows a flowchart with the decision process for the calibration manager in determining the operation of the backlight.

In some embodiments, contrary to the multitude of work done to correct flicker or in addition thereto, the effect can also be used as a security mechanism, in the form of a watermark, or a predictable aspect of an image. As the presence of flicker can be detected in the images generated by the scanning surface, the pattern provides a way of authenticating the frames of a video feed to be true and in order. Should a player have access and control over the video feed before it reaches the processor for analysis, he/she could wish to alter the video feed by deleting a select number of frames, and inserting a different set of frames that show a series of events that are beneficial to the player in that situation, but did not occur in reality. It is an embodiment of the present invention to prevent this from happening, and/or analyse the input given to the image processing module of the device in such a way that the change can be detected and flagged as being irregular. No matter the number of measures taken to prevent a user from having access to the video feed, it is still important to handle and/or prevent the implications should such an event occur. Firstly, it is important to define which type of attacks the invention is trying to prevent from happening. When a player only has access to the video feed the device uses (e.g., the images the device captures), their main option in tricking the device into thinking a particular event has happened, is replacing either the entire video feed for that session, or a set of frames that constitutes part of the video feed for that session, so that the dice recognized is of a correct value. A flicker pattern caused by ambient light sources flickering at a certain frequency, can be recognized on a single or multiple frames of the imager. Based on the pattern the light generates, and the (constant) speed with which the lines move relative to the imager, the location of a set of lines in a next frame can be determined. Even when the readout speed and flicker speed of the lights are synchronised, this principle stands; the number, location and intensity of lines on the imager are then expected to be fixed within a certain margin for error.

At the start of a new session for the device, the ambient light monitor of the device measures the characteristics of ambient light. The characteristics include the flicker frequency, flicker intensity and/or ambient light intensity. Data is sent from the device to a proprietary server via the available connector(s) (ethernet, Wi-Fi, USB, Firewire, Bluetooth, . . . ) directly, or via a secondary device such as a computer, tablet, smartphone, . . . .

This is achieved by the processor instructing the ambient light monitor to provide the necessary input, and transmitting this input to the server. The data sent to the server can be images with the corresponding timestamps, and/or the numerical data consisting of the relevant aspects of the visual data, e.g., flicker frequency, flicker intensity, and/or ambient light intensity. This data is called reference data.

When a new sequence is detected on the imager (a new sequence is started when, after a period of unchanged captured images, movement is detected on the imager. The sequence ends when movement on the imager ends, for example when dice come to a standstill on the imager) and a dice throw is recognized an analysed, the result (number of dice, dice values, . . . ) and one or more images of the result and/or the numerical data consisting of the relevant aspects of the visual data, e.g., flicker frequency, flicker intensity, and/or ambient light intensity are sent to the server for verification. This data is called sequence data. The result is captured by the result generator inside the device, and the images and/or numerical data for verification are added by the security manager. The sequence data is retrieved by the processor and uploaded to the server in a similar manner as the reference data.

The verification carried out by the server may consist or comprise of calculating the expected flicker pattern based on the timestamp of the image(s) and/or numerical data in the sequence data, received during or after the input, and the reference image(s) and/or numerical data in the reference data, received as input at the start of the session. If the measured flicker pattern does not conform within a set margin of error to the flicker pattern expected by the server, the result is flagged as invalid, and the user of the device is instructed to recalibrate the device so that (a) new reference image(s) and/or numerical data can be captured, processed and uploaded, to update the reference data. When a device produces a large number of recalibrations, it can be flagged as an attempt to tamper with the device, prompting closer inspection.

Figure 11:
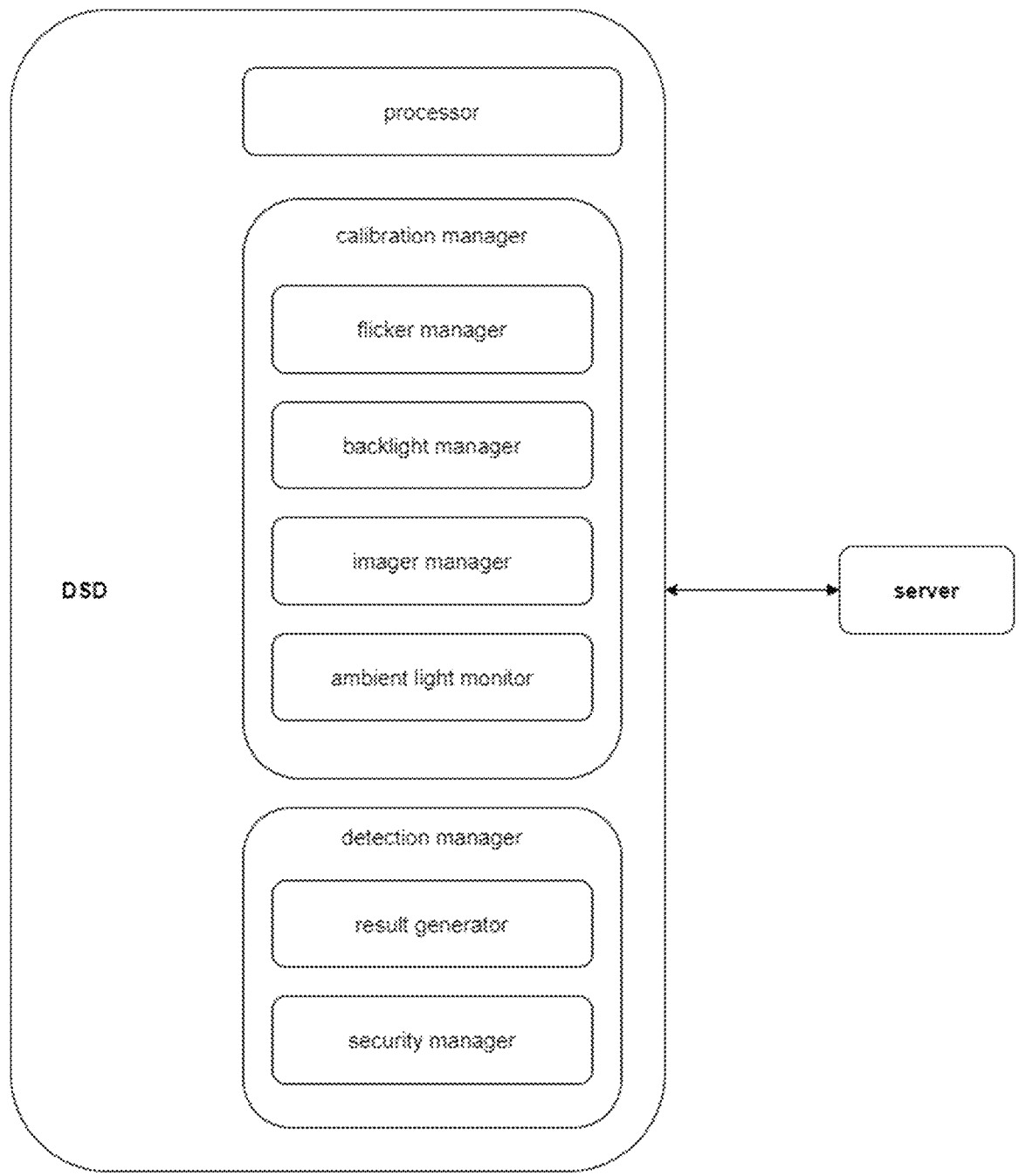

In a second exemplary embodiment of a system using flicker for security check, all images captured by the imager are transmitted to the server via the available transmitters in the device, and all image processing tasks including image recognition (such as dice) are performed on the server. In this embodiment, the ambient light monitor is housed on the server, and uses image data already on the server to perform its analysis. When a sequence is started, the server compares the saved images and/or numerical data from the reference dataset to the selected images during the sequence. FIG. 11 shows the different managers described, and the interaction with the server necessary to verify the results.

These security mechanisms can be circumvented should the user be able to access the entire video stream (including calibration, for example showing a full throw or set of throws). It is an object of at least some embodiments of the present invention to prevent this method of tampering from being possible while using the device. The video stream is therefore in some embodiments checked by prompting the player to place a defined object at a certain location on the device, validating the start of the session, i.e., image recognition inside the device, or a video stream to the server for image recognition. A signal indicating the location of an object, and the specification of the object (for example a dice) is sent from the server to the device, which prompts the player in taking the requested action. The confirmation of the action is captured by the security manager in the form of an image and/or numerical data on the location, size, and/or specification of the object(s) on top of the imager, and is sent to the server, where it is checked and validated. The number of objects and the variability in these objects determine the level of security possible within this arrangement.

Figure 12:
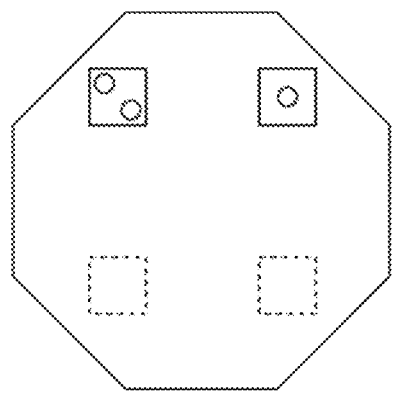

For example, as shown in FIG. 12, the player is instructed to place at least 2 dice in the upper left and right corner of the device, with the numbers 2 and 1 showing in respectively the left and right location.

Figure 13:
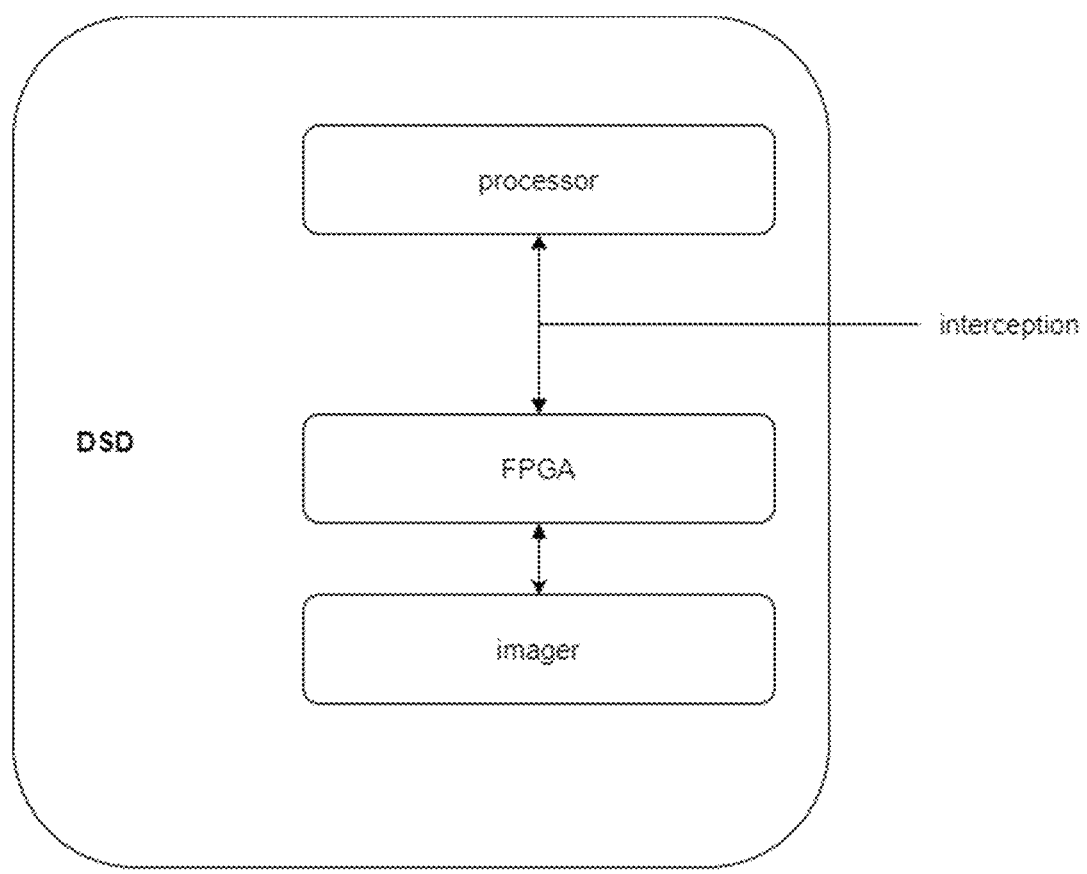
Figure 14:
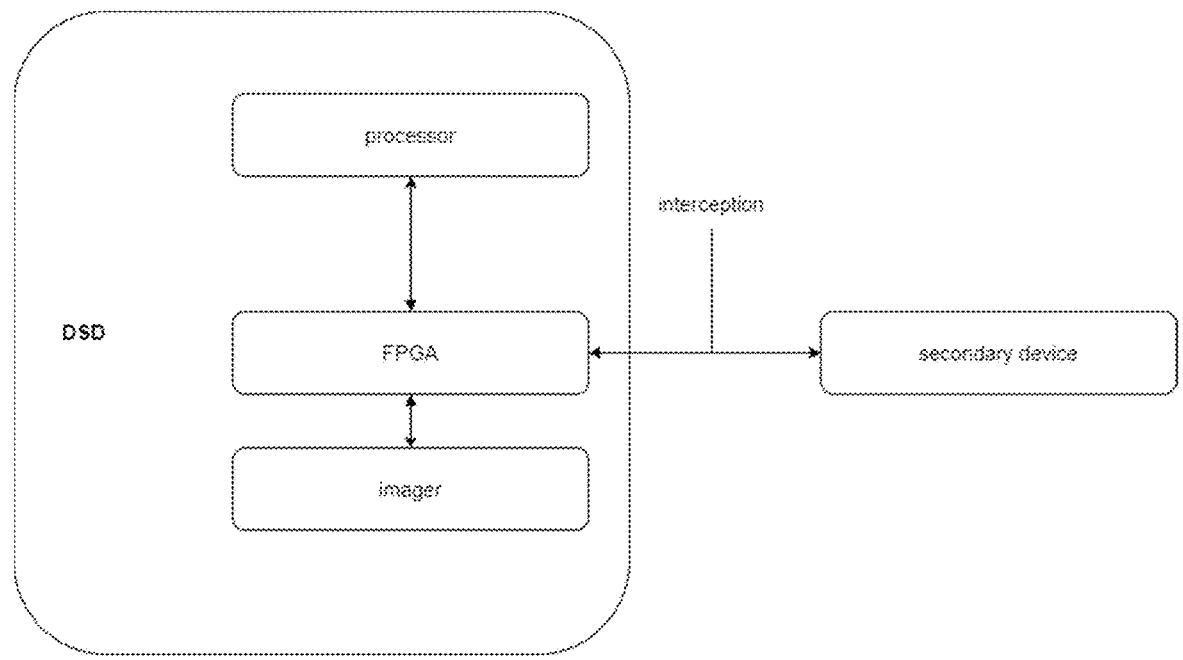
Figure 15:
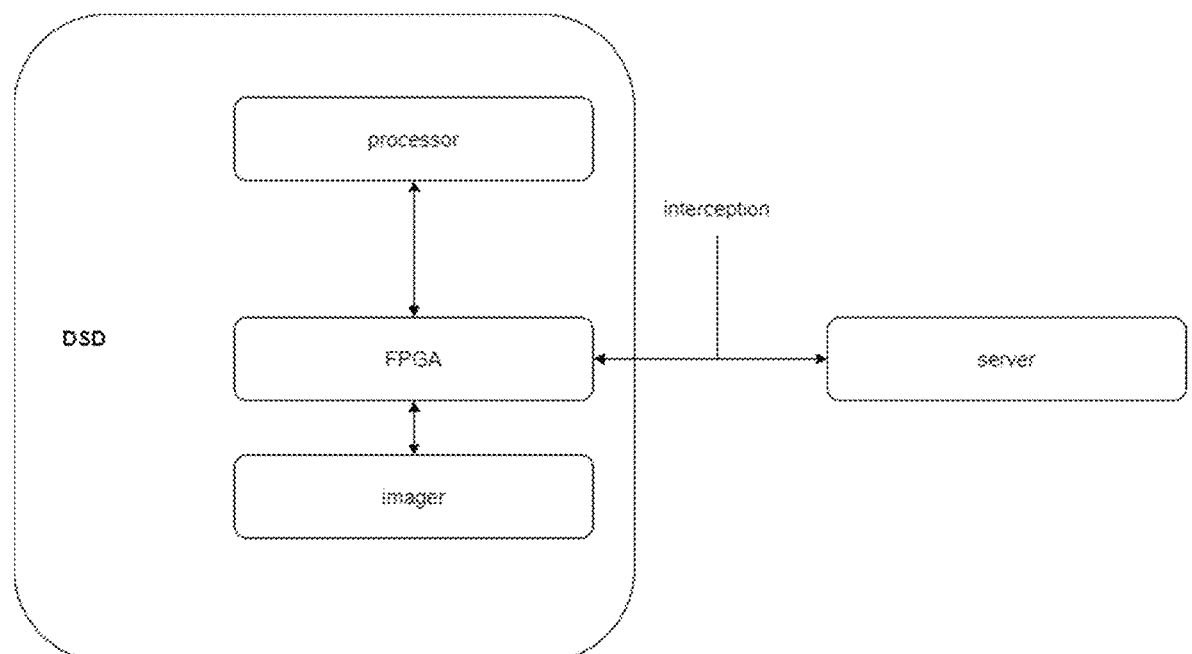

FIG. 13 shows where the images used for dice detection and other mechanisms could be intercepted and altered inside the device. It is likely this would take place between the formation of the images from the electrical signals from the imager by a microcontroller, FPGA, or other component capable of this operation. In this case, all processing of the image data is performed inside the device. If this is not the case, and a secondary connected device is responsible for processing the image data, the point of entry lies in the connection between the formation of images inside the device and the connected secondary device. This secondary device can be a computer, tablet, mobile phone, . . . This case is shown in FIG. 14. FIG. 15 shows a similar case to FIG. 14, where image processing is performed on the server, e.g., all images are transmitted to the server.

Figure 16:
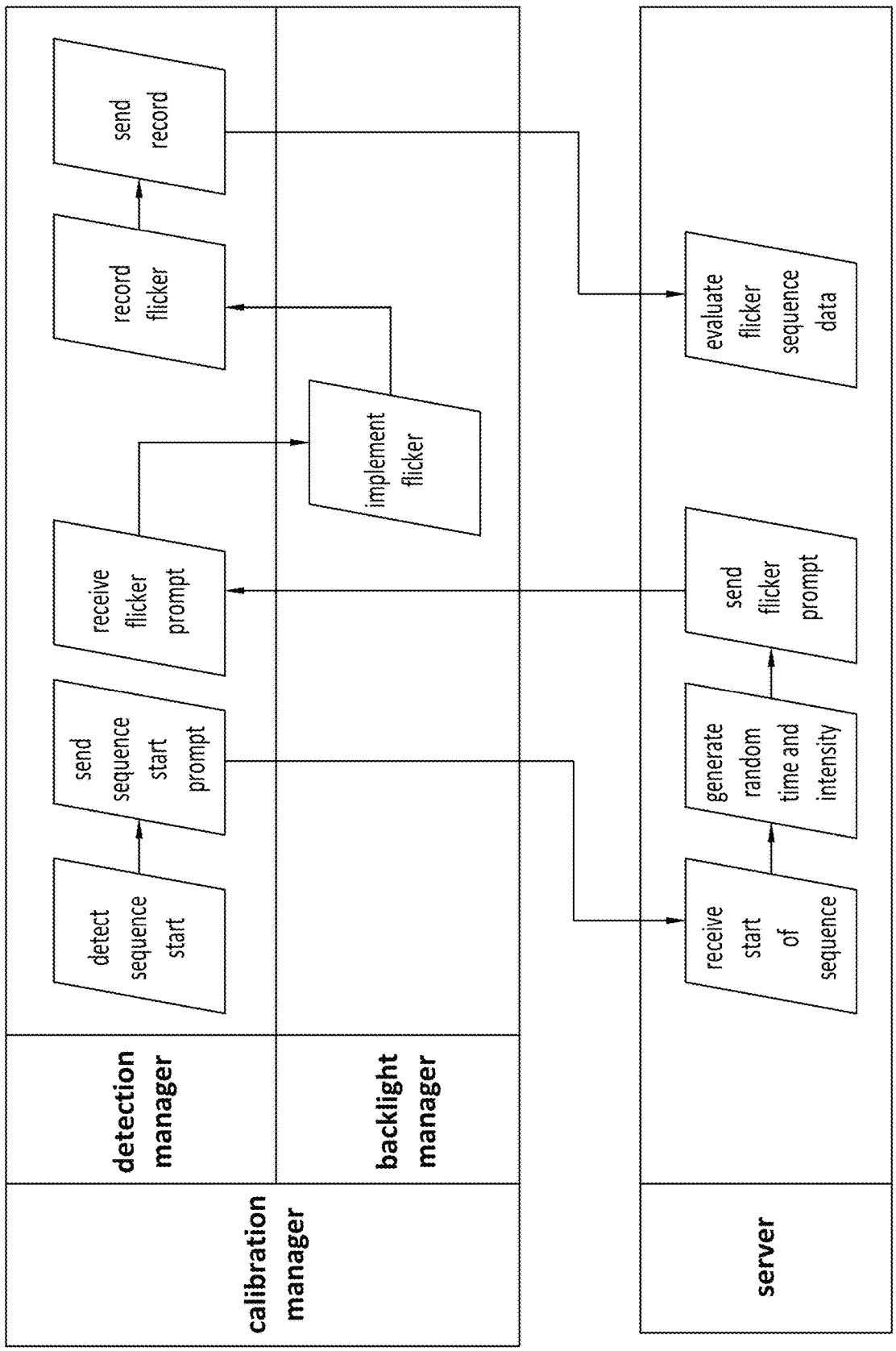

As an additional security feature, periodic artificial flickers can be introduced in the device to verify the authenticity of the images utilised by the result generator. The artificial flickers can be generated by controllable light sources, preferably the backlight. When the imager detects relevant movement on the imager and a sequence is started, the server is informed of this event, and the server generates instructions to the device at random intervals. These instructions include at least the time and intensity of a flicker to be executed by the device. The processor instructs the backlight manager to vary the backlight intensity at a particular time instructed by the server, and the security manager captures the image corresponding with the timestamp mentioned. The resulting image and/or numerical data is sent to the server for verification, where it is checked if the realized variation is within the bounds of the specified instruction. If the image processing is not performed by the device itself, the images and/or numerical data is sent to the server by the secondary device used for processing, or handled by the server internally. The above process is shown in FIG. 16, illustrating how evaluation of flicker can be used to evaluate flicker sequence data.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A dice scanner for assisting in electronic gaming, comprising:
a flat scanner having a scanning surface adapted for rolling of one or more thrown dice, the flat scanner being configured for acquiring images of the scanning surface and the dice rolling or resting on the scanning surface in real time,
a processor configured for receiving one or more acquired images of the scanning surface and deriving therefrom data relating to the dice,
a video acquisition system and/or an audio acquisition system arranged relative to the scanning surface such that at least a user face and/or at least a user voice can be recorded while gaming, thereby enabling interaction of said user with further, remote users or with the dice scanner,
the video acquisition system being a camera mounted on an extendable arm, having an extended and a retracted configuration, one end of said arm being secured to an upstanding sidewall of the dice scanner,
wherein said upstanding sidewall of the dice scanner comprises a recessed portion for storing the extendable arm in the retracted configuration or wherein the camera is pivotably mounted on the extendable arm such that a camera orientation can be pivoted horizontally and vertically by at least 320° with respect to the scanning surface, and/or wherein a length of the extendable arm in the extended configuration is 50 cm to 100 cm longer as compared to the retracted configuration.

2. The dice scanner according to claim 1, comprising at least the audio acquisition system, wherein the audio acquisition system comprises at least one microphone and/or comprising a sound processor for digitizing, or digitizing and compressing, a user voice record.

3. The dice scanner according to claim 2, further comprising a network interface module for transmitting digitized user voice records to a data network and for receiving transmitted digitized user voice records of further, remote users and/or speech recognition processed user voice records from the data network.

4. The dice scanner according to claim 2, further comprising audio output for outputting recorded sound and/or voice of further, remote users, and/or for synthesizing auditory feedback relating to a game state, a user input and/or an operation of the dice scanner.

5. The dice scanner according to claim 4, wherein the audio output comprises at least one loudspeaker provided as an external loudspeaker connected to an audio output connector of the dice scanner, or wherein the at least one loudspeaker is arranged on or in an upstanding sidewall of the dice scanner, said upstanding sidewall being secured to the scanning surface.

6. The dice scanner according to claim 1, further comprising a cellular communication module for accessing a data network and/or wherein the processor is further configured for encrypting recorded video and/or audio data acquired by the video and/or audio acquisition system.

7. The dice scanner according to claim 1, wherein the dice scanner furthermore comprises an audio acquisition system arranged relative to the scanning surface such that at least a user voice can be recorded while gaming, thereby enabling interaction of said user further, remote users or with the dice scanner.

8. A dice scanner for assisting in electronic gaming, comprising:
a flat scanner having a scanning surface adapted for rolling of one or more thrown dice, the flat scanner being configured for acquiring images of the scanning surface and the dice rolling or resting on the scanning surface in real time,
a processor configured for receiving one or more acquired images of the scanning surface and deriving therefrom data relating to the dice,
a receiving section for receiving an apparatus for capturing and/or displaying of video data such that the video data, when captured by the received apparatus while gaming, accommodates a front view of a user's face, and/or, when displayed on the received apparatus while gaming, is viewed by a user at an ergonomic viewing angle, wherein the receiving section comprises a hinged holding member for holding said apparatus for capturing and/or displaying of video at a viewing angle, an elongated groove adapted to receive an elongated edge of said apparatus for capturing and/or displaying of video, and an inclination control device for adjusting the viewing angle of the holding member.

9. The dice scanner according to claim 8, wherein the holding member comprises extendable prongs, and/or the elongated groove is formed as an extrusion on an upper surface of an upstanding sidewall of the dice scanner, said upper surface facing away from the scanning surface.

10. The dice scanner according to claim 8, wherein the inclination control device comprises an adjustment screw, a fixation member rigidly connected to the flat scanner for retaining the adjustment screw in a fixed position relative to the flat scanner, and a threaded retaining member operatively engaging with the adjustment screw such that a rotation of the adjustment screw causes a linear translation of the retaining member relative to the flat scanner, whereby a contact angle between the holding member and a bearing surface of the retaining member, defining said viewing angle, is controlled.

11. A dice scanner for assisting in electronic gaming, comprising:
a flat scanner having a scanning surface adapted for rolling of one or more thrown dice, the flat scanner being configured for acquiring images of the scanning surface and the dice rolling or resting on the scanning surface in real time,
a processor configured for receiving one or more acquired images of the scanning surface and deriving therefrom data relating to the dice,
a video acquisition system and/or an audio acquisition system arranged relative to the scanning surface such that at least a user face and/or at least a user voice can be recorded while gaming, thereby enabling interaction of said user with further, remote users or with the dice scanner,
the video acquisition system being a camera mounted on an extendable arm, having an extended and a retracted configuration, one end of said arm being secured to an upstanding sidewall of the dice scanner,
wherein said upstanding sidewall of the dice scanner comprises a recessed portion for storing the extendable arm in the retracted configuration or wherein the camera is pivotably mounted on the extendable arm such that a camera orientation can be pivoted horizontally and vertically by at least 320° with respect to the scanning surface, and/or wherein a length of the extendable arm in the extended configuration is 50 cm to 100 cm longer as compared to the retracted configuration, and wherein the processor is further configured for generating image and/or video content and the flat scanner comprises a pixelated backlight structure for illuminating the scanning surface from a backside, opposite to the dice rolling side of the scanning surface, and for displaying the generated image and/or video content through the scanning surface to a user.

12. The dice scanner according to claim 11, wherein the flat scanner further comprises a light detection layer arranged between the backlight structure and the scanning surface, the light detection layer including an array of transparent or translucent photodetectors.

13. The dice scanner according to claim 11, further comprising a network interface module for receiving image and/or video data from a data network, wherein the processor is configured for generating said image and/or video content based on the received image and/or video data.

14. The dice scanner according to claim 13, wherein the generated image and/or video content to be displayed by the backlight structure is part of, or defines, a game layouts and/or a graphical user interface for receiving user input.

15. The dice scanner according to claim 11, wherein the processor is further configured to detect user input in acquired images of the scanning surface, based on image contrast differences in the presence of a light-reflecting user input implement, preferably a stylus or a user's finger, in the vicinity of, or touching, the scanning surface in a user input sensitive portion of the displayed graphical user interface and/or wherein the processor is further configured for encrypting a received user input.

16. The dice scanner according to claim 11, wherein the scanning surface comprises a transparent gas-bubble free substantially homogeneous adhesives or filler layer.

17. The dice scanner according to claim 11, wherein the derived data relating to the dice comprises at least one of: an eye number on a dice face resting on the scanning surface, a shape of the dice, a size of the dice, a rest position of the dice on the scanning surface, a trajectory of the thrown dice rolling on the scanning surface, a rolling speed of the thrown dice rolling on the scanning surface, a rolling direction of the thrown dice rolling on the scanning surface.

\* \* \* \* \*